E. J. B. DANKS.
GUARD FOR PRESSES AND OTHER MACHINERY.
APPLICATION FILED SEPT. 16, 1919.

1,358,528.

Patented Nov. 9, 1920.
2 SHEETS—SHEET 1.

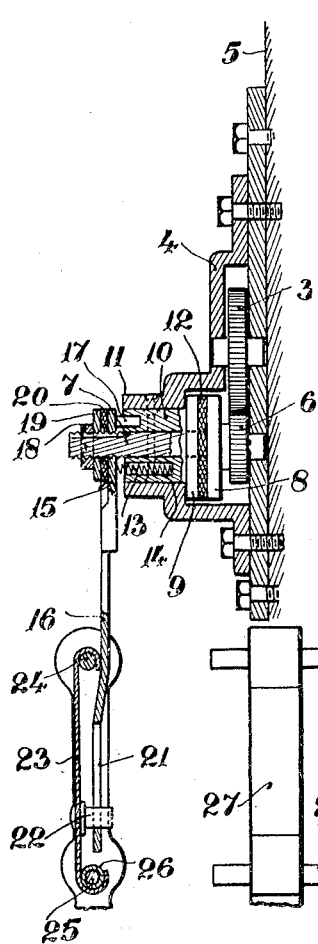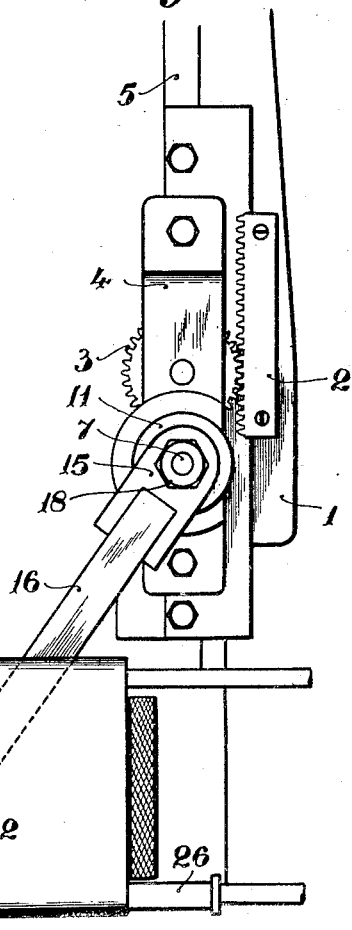

UNITED STATES PATENT OFFICE.

ELISHA JOHN BRYANT DANKS, OF BIRMINGHAM, ENGLAND.

GUARD FOR PRESSES AND OTHER MACHINERY.

1,358,528. Specification of Letters Patent. Patented Nov. 9, 1920.

Application filed September 16, 1919. Serial No. 324,120.

*To all whom it may concern:*

Be it known that I, ELISHA JOHN BRYANT DANKS, subject of the King of Great Britain, residing at Handsworth, Birmingham, England, have invented certain new and useful Improvements in Guards for Presses and other Machinery, of which the following is a specification.

This invention relates to automatic guards for power presses and other machinery, such guards being actuated by the ram or other suitable moving part of the machine.

More particularly the invention relates to guards of that type comprising a sliding member arranged to move across the work-space.

The object of the present invention is to provide a guard of this type which quickly moves into its protecting position so as to cover the work space, as soon as the tool has completed only a small part of its stroke, prior to the said tool reaching the proximity of the work.

According to the said invention there is provided in conjunction with the actuating mechanism, means whereby, on the sliding guard being arrested in its protecting position covering the work-space, a relative movement of the operating member carried by the moving part of the machine is permitted while said moving part completes its stroke; and likewise, on the guard being stopped in its withdrawn position, a relative movement of the operating member is permitted, while the moving part completes its return stroke.

Preferably the slide is actuated by a lever or arm operated from the moving part of the machine by rack-and-pinion or equivalent gearing, in combination with a friction clutch which slips when the guard is arrested in its protecting position, but immediately acts to return the guard and quickly removes it from in front of the work-space when the moving part of the machine commences its return stroke, the clutch again slipping, on the guard reaching the withdrawn position, while the said moving part completes its return stroke.

Figure 1 of the accompanying drawings is a front elevation of the guard as applied to a power press, the said guard being shown by full lines in its withdrawn position and by dotted lines in its protecting position.

Fig. 2 is a front elevation of the guard on a larger scale, and

Fig. 3 is a vertical section showing the arrangement of the friction clutch.

Figure 1:
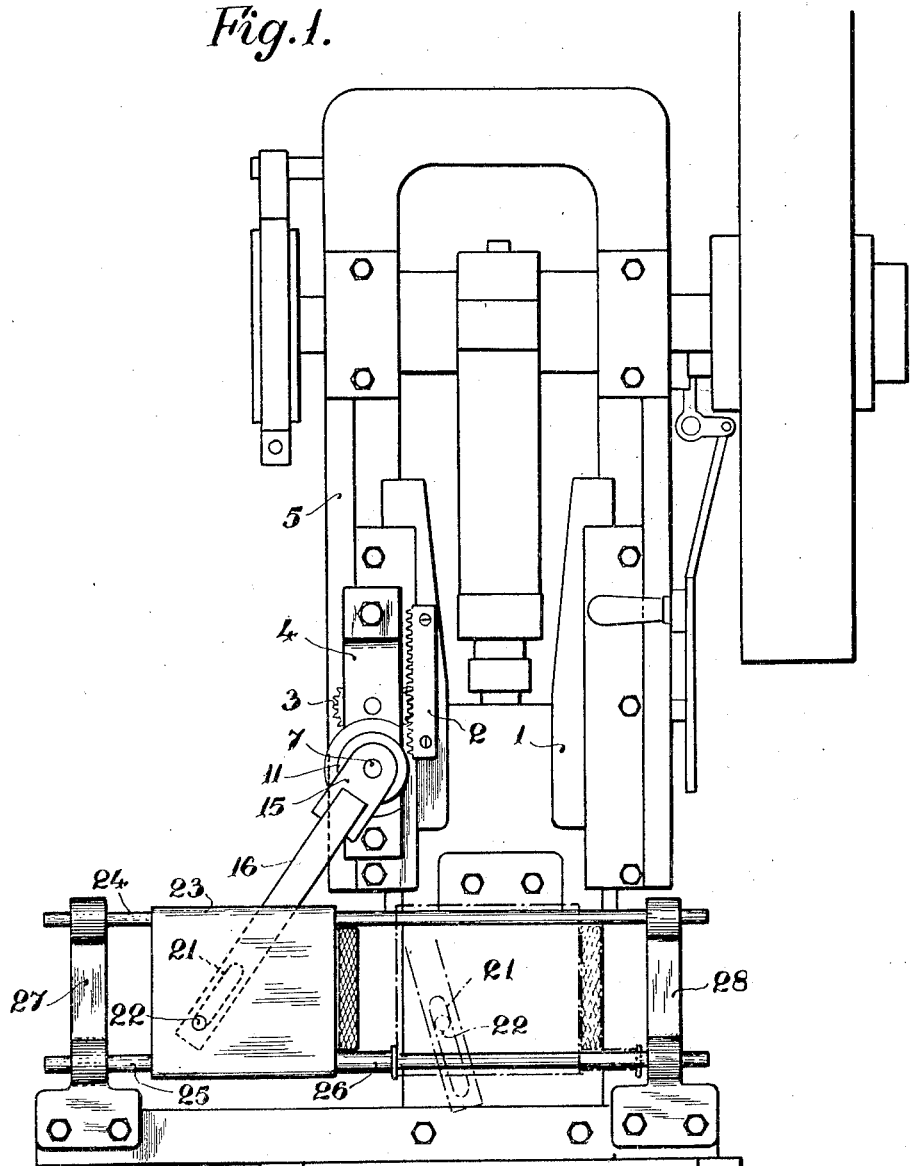

The ram or plunger 1 of the press carries a toothed rack 2 gearing with a pinion 3 mounted in a frame or bracket 4 attached to the side standard 5 of the press. The pinion 3 engages with another pinion 6 fixed upon a spindle 7 carrying an integral collar or disk 8 forming one member of a face-type friction clutch. The other member consists of a collar or disk 9 carried by a sleeve 10 freely mounted upon the spindle 7 and supported within a housing or bearing 11 of the frame or bracket 4. Between the opposed faces of the collars or disks 8, 9 is interposed a washer 12 of fiber, leather or the like, which is adapted to be gripped between the said parts, in order to convey the drive, by means of coiled springs 13 located in recesses 14 in the sleeve 10. These springs bear at their outer ends against the face of the inner end 15 of the guard-actuating lever 16. This lever is freely mounted upon the spindle 7 and carries two pins 17 (only one shown) engaging recesses in the end of the sleeve 10, while interposed between the outer face of the end 15 of the lever and a metal washer 19 keyed to the spindle 7 and fixed by a nut 18, is a fiber, leather or like washer 20. The parts 15, 20, 19 thus form a second friction clutch. The lower end of the lever 16 is provided with a longitudinal slot 21 engaging a pin 22 carried by the guard 23, the latter being mounted to slide upon horizontal guide-rails 24, 25. The guard 23 may be made of sheet-metal, the lower edge being secured to a sleeve 26 sliding on the lower rail 25 and adapted to engage with stop brackets 27, 28, at opposite ends of the rails.

In operation, as the ram of the press descends, the rack 2, acting through the pinions 3, 6, rotates the shaft 7, and through the medium of the friction clutches the lever or arm 16 is moved angularly in order to move the sliding guard 23 into its protecting position in front of the work space, as shown by dotted lines in Fig. 1. The guard completes this movement when the tool has only made a small proportion of its stroke—for instance, at one-third of its stroke—the end of the sleeve 26 striking the stop-bracket 28. The movement of the guard 23 being thus arrested, the friction clutches 8, 9, 12 and 15, 19, 20 slip in order to allow the spindle 7 to continue to rotate as the ram completes its stroke. As soon as the ram commences to rise, the motion is transmitted through the gearing and clutches in order quickly to return the guard to its withdrawn position clear of the work-space, the sleeve 26 engaging the stop-bracket 27 to arrest the movement of the guard. This happens soon after the tool has commenced its up stroke, when the clutches again slip to allow of the continued rotation of the spindle 7 during the completion of the said up-stroke.

Although the invention has been described in connection with a power-press, it is obvious that the guard is equally applicable to other machinery having a reciprocating action.

It is also evident that modifications may be made in the illustrated embodiment of my invention without departing from the spirit thereof, and it is my desire to include all such modifications within the purview of my invention if properly within the scope of the appended claims.

Having fully described by invention, what I desire to claim and secure by Letters Patent is:—

1. A guard for machinery comprising a sliding member which is actuated by a lever or arm operated from a moving part of the machine, in combination with a friction device which slips when the guard is arrested in its protecting position after the said moving part has made only a portion of its stroke, but immediately acts to return the guard on the moving part commencing its return stroke, the said friction device again slipping on the guard being arrested in its withdrawn position, while the said moving part completes its return stroke.

2. In guards for machinery, the combination with a sliding member movable across the work space, of a lever for operating the sliding member, a shaft upon which the lever is freely mounted, means for driving the shaft from the machine, and a friction clutch between the shaft and operating lever, said friction clutch comprising a sleeve having a driving connection with the lever and forced axially against a friction surface interposed between the end of the sleeve and a collar on the shaft.

3. In guards for machinery, the combination with a sliding member movable across the work-space, of a lever for operating the sliding member, a shaft upon which the lever is freely mounted, means for driving the shaft from the machine, a friction clutch between the outer face of the lever and an abutment on the shaft, and a second friction clutch between the shaft and lever comprising a sleeve having a driving connection with the lever and forced axially against a friction surface interposed between the end of the sleeve and a collar on the shaft.

In testimony whereof I have hereunto set my hand in presence of two subscribing witnesses.

ELISHA JOHN BRYANT DANKS.

Witnesses:
 C. H. MERRETT,
 H. O. PRATT.